Jan. 11, 1927.  
H. C. PAUL  
SPRING COVER  
Filed March 5, 1925

1,614,150

INVENTOR  
Howard C. Paul  
BY  
ATTORNEY

Patented Jan. 11, 1927.

1,614,150

UNITED STATES PATENT OFFICE.

HOWARD C. PAUL, OF MELROSE, MASSACHUSETTS, ASSIGNOR TO ANDERSON MANUFACTURING COMPANY, OF EVERETT, MASSACHUSETTS, A CORPORATION OF MASSACHUSETTS.

SPRING COVER.

Application filed March 5, 1925. Serial No. 13,061.

This invention relates to covers for the springs of automobiles and similar vehicles. Such covers are now used very generally and they serve the purpose both of protecting the spring from the entrance of mud and water between the leaves thereof, and also of confining oil or grease closely around the spring where it can work in between the leaves of the spring and keep it lubricated. Heretofore spring covers have usually been secured on the springs by a lacing or by buckles and straps. The lacing arrangement is objectionable since the lacing is liable to break, and the hooks sometimes pull out of the cover, while straps and buckles are even less satisfactory. Accordingly, it is the chief object of this invention to improve spring covers with a view to facilitating the initial installation of such covers on the springs and to devise improved means for fastening the edges of spring covers together.

The nature of the invention will be readily understood from the following description when read in connection with the accompanying drawings, and the novel features will be particularly pointed out in the appended claims.

Referring now to the drawings.

Figure 1:
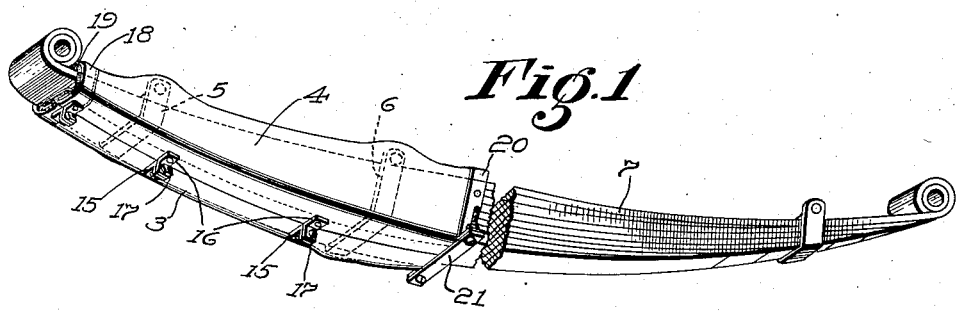
Figure 1 is a perspective view of a part of an automobile spring showing it equipped with a cover embodying this invention.
Figures 2, 3:
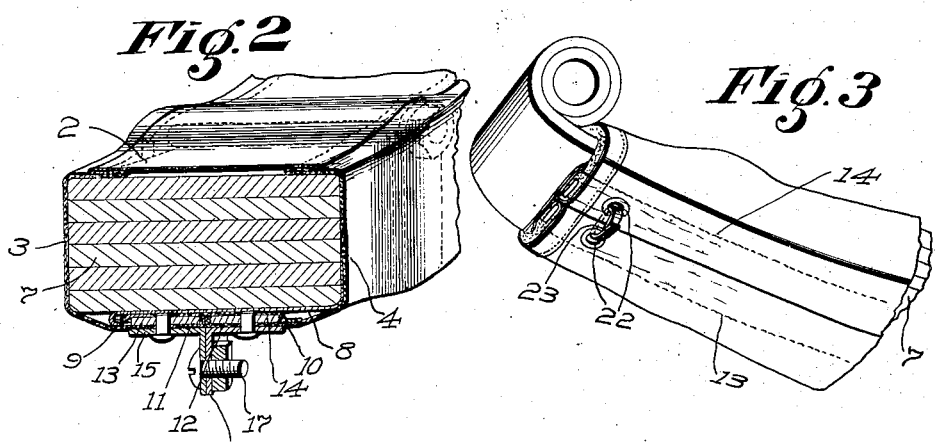
Fig. 2 is a cross sectional view through the spring and cover shown in Fig. 1.
Figs. 3 and 4 are perspective views showing modified embodiments of the invention.

Referring first to Figs. 1 and 2, the spring cover there shown preferably is made in accordance with the disclosure in Patent No. 1,502,649, dated July 29, 1924. This cover comprises a top section 2 and two lateral sections 3 and 4, respectively, all these sections being stitched together and so shaped that the cover will fit smoothly over the rebound clips 5 and 6 of the spring 7. The cover is designed to encircle a spring, as shown in Figs. 1 and 2, the upper section 2 covering the top of the spring while the lateral sections 3 and 4 cover the opposite edges of the spring, the marginal portions of these lateral sections being overlapped upon the bottom of the spring. Preferably a flap 8 is stitched to the edge of one of the lateral sections 3 or 4 where it can be folded back across the space between the edges of these sections and thus close the joint between the edges of the cover. Usually the cover is made of leather or imitation leather.

In the construction shown the edge portions of the sections 3 and 4 are folded over and stitched, as shown at 9 and 10, respectively, to form tubular edges 11 and 12 which extend longitudinally of the cover for its entire length. Located within these tubular portions are two reinforcing members 13 and 14, respectively, each preferably consisting of a flap strip of iron, steel, or other metal. These metal strips reinforce the opposite edges of the cover against bending laterally or in a direction transverse to the plane of flexure of the spring, but they are sufficiently flexible to bend freely with the spring as it flexes.

For the purpose of securing the cover in its operative position on the spring, small angular brackets 15 and 16 are riveted to the opposite reinforced edges of the cover, the rivets preferably extending through both the metal strips and the tubular portions of the cover in which they are located. The downwardly projecting portions of each pair of brackets are secured together by a bolt 17. Any desired number of these fastenings may be used on each cover, but only a relatively few of them are required for the reason that the metal strips 13 and 14 are relatively rigid against lateral bending. In the arrangement shown the two edges of the cover are drawn together in abutting relationship, but this relationship may be varied.

As shown in Fig. 1 a reinforcing strap 18 is stitched to the small end of the cover, and a lining of felt 19 is also stitched inside the cover at this point to assist in making a tight joint between the cover and the spring. A similar lining may be used at the opposite end of the cover. I prefer, also, to use a U-shaped metal clamp 20 at the larger end of the cover, the ends of this clamp being secured to a bar 21 that extends across the lower face of the spring.

It will now be evident that a spring cover equipped with reinforcing members, such as those shown at 13 and 14, can be placed on a spring much more quickly than prior constructions and that the fastenings will hold the cover securely on the spring until it is practically worn out.

The opposite edges of the cover may be fastened together in a great variety of ways. One arrangement has been shown in Figs. 1 and 2. Fig. 3 shows a somewhat different arrangement in which eyelets 22 are set into the opposite edges of the cover and these edges are secured together by a strip of metal 23 which is inserted through the eyelets, pulled up tightly with pliers, and the ends then folded down.

Figure 4:
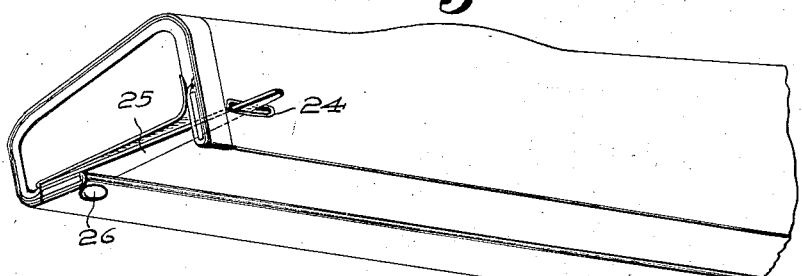
Figure 5:
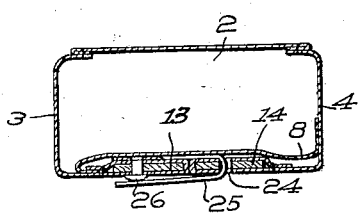
Fig. 5 is a cross sectional view of the construction shown in Fig. 4.

Still another arrangement is shown in Figs. 4 and 5 in which an elongated slot 24 is cut through one edge of the cover and its reinforcement, and a strip or tongue of sheet metal 25 is secured to the opposite edge of the cover by a rivet 26. After the cover has been placed on the spring the end of the tongue 25 is inserted in the hole 24 and bent outwardly, thus drawing the cover firmly around the spring and pulling the two opposite edges together. The tongue 25 is then bent over, as shown at Fig. 5, thus securely fastening the opposite edges of the cover together, the tongue having sufficient stiffness to prevent the edges from separating. Two or more of these fastenings are used on each cover.

In all of these constructions the matter of securing the cover on a spring is accomplished much more easily than in prior constructions where straps or lacings have been depended upon, and the danger of the fastenings breaking is substantially eliminated.

While I have herein shown and described the best embodiment of my invention that I have so far devised, it is contemplated that minor modifications in details may be made without departing from the spirit or scope of the invention.

Having thus described my invention, what I desire to claim as new is:

1. An article of the character described comprising a cover for an automobile spring, said cover being shaped to encircle the spring and having opposed edge portions arranged to extend longitudinally of the spring, metal strips secured to said edge portions of the cover and reinforcing said edges against bending transversely to the direction of flexing of the spring but adapted to bend with the spring, and means for fastening said reinforced edges to each other.

2. An article of the character described comprising a cover for an automobile spring having parts to cover the opposite sides and the top of the spring and including marginal portions adapted to substantially cover the lower side of the spring and to extend longitudinally of the spring, said marginal portions including tubular edges, flat metal strips located in said tubular edges and extending substantially the entire length of said edges, and means adapted to cooperate with said metal strips to draw them edgewise toward each other and thereby to fasten said edges of the cover together.

3. An article of the character described comprising a cover for an automobile spring, said cover being shaped to encircle the spring and having edge portions arranged to extend longitudinally of the spring, reinforcing members extending along said edge portions and serving to stiffen said edges against bending transversely to the direction of flexing of the spring but permitting said edges to bend with the spring, said members being of material different from that of which the cover is made, and means for fastening said reinforced portions of the cover to each other.

HOWARD C. PAUL.